US010220689B2

(12) United States Patent
Sviberg (10) Patent No.: US 10,220,689 B2
(45) Date of Patent: Mar. 5, 2019

(54) TOP OF A VEHICLE COMPRISING LOCKING MEANS

(71) Applicant: Webasto SE, Stockdorf (DE)

(72) Inventor: Magnus Sviberg, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 15/639,912

(22) Filed: Jun. 30, 2017

(65) Prior Publication Data

US 2019/0001799 A1  Jan. 3, 2019

(51) Int. Cl.
*B60J 7/08* (2006.01)
*B60J 7/185* (2006.01)
*E05B 81/16* (2014.01)
*B60J 7/14* (2006.01)

(52) U.S. Cl.
CPC ............ *B60J 7/1855* (2013.01); *B60J 7/146* (2013.01); *E05B 81/16* (2013.01)

(58) Field of Classification Search
CPC ............ B65D 2571/0066; B65D 71/48; Y10T 70/459; Y10T 70/489; Y10T 70/7921; G06F 1/1616; G06F 1/1632; G06F 1/166; G06F 1/1635; H01L 2924/0002
USPC ............................................ 296/108
See application file for complete search history.

(56) References Cited

U.S. PATENT DOCUMENTS

| 5,667,269 | A * | 9/1997 | Prenger | B60J 7/1234 |
| | | | | 296/107.09 |
| 6,502,891 | B2 * | 1/2003 | Russke | B60J 7/146 |
| | | | | 296/107.17 |
| 7,654,606 | B2 * | 2/2010 | Hollenbeck | B60J 7/1265 |
| | | | | 296/107.09 |
| 2001/0006297 | A1 * | 7/2001 | Dintner | B60J 7/146 |
| | | | | 296/107.17 |
| 2004/0012222 | A1 * | 1/2004 | Hollenbeck | B60J 7/1204 |
| | | | | 296/107.09 |
| 2004/0145210 | A1 * | 7/2004 | Fuchs | B60J 7/202 |
| | | | | 296/107.08 |
| 2004/0155482 | A1 * | 8/2004 | Netzel | B60J 7/146 |
| | | | | 296/108 |
| 2006/0249978 | A1 * | 11/2006 | Rosler | B60J 7/146 |
| | | | | 296/107.08 |
| 2007/0194597 | A1 * | 8/2007 | Liedmeyer | B60J 7/1265 |
| | | | | 296/107.09 |

(Continued)

*Primary Examiner* — Kiran B Patel
(74) *Attorney, Agent, or Firm* — Fitch, Even, Tabin & Flannery, LLP (57) ABSTRACT

A top for a convertible vehicle, displaceable between a closed position to cover a vehicle interior, and an open storage position, the top having a top linkage, which has a link arrangement on both sides with respect to the top vertical longitudinal center plane, each link arrangement pivotably mounted on a main bearing, which is fixed to the vehicle, a top element, which can be displaced between a lifted operating position and a lowered storage position by means of the top linkage, and a locking means on both sides of the vertical longitudinal center plane of the top, each locking means being height-adjustable together with the top element and comprising a locking hook arrangement, which is displaceable between a locked position and a release position and which secures the top element, both in the operating and storage position, to at least one component fixed to the vehicle body.

12 Claims, 11 Drawing Sheets (56) References Cited

U.S. PATENT DOCUMENTS

| | | | | |
|---|---|---|---|---|
| 2008/0018132 | A1* | 1/2008 | Meinert | B60J 1/1823 |
| | | | | 296/99.1 |
| 2008/0265610 | A1* | 10/2008 | Condon | B60J 7/148 |
| | | | | 296/107.08 |
| 2008/0309127 | A1* | 12/2008 | Wegener | B60J 7/1856 |
| | | | | 296/223 |
| 2010/0201150 | A1* | 8/2010 | Kinnanen | B60J 7/205 |
| | | | | 296/107.08 |
| 2010/0289292 | A1* | 11/2010 | Habacker | B60J 7/1851 |
| | | | | 296/121 |
| 2012/0025562 | A1* | 2/2012 | Beierl | B60J 7/1265 |
| | | | | 296/108 |
| 2013/0038084 | A1* | 2/2013 | Kinnanen | B60J 7/146 |
| | | | | 296/107.17 |
| 2015/0042123 | A1* | 2/2015 | Haberl | B60J 7/1204 |
| | | | | 296/117 |
| 2015/0115646 | A1* | 4/2015 | Bowles | B60J 7/12 |
| | | | | 296/118 |
| 2016/0221425 | A1* | 8/2016 | Haberl | B60J 7/0573 |
| 2017/0334276 | A1* | 11/2017 | Wullrich | B60J 7/145 |
| 2018/0001752 | A1* | 1/2018 | Saka | B60J 7/143 |
| 2018/0201104 | A1* | 7/2018 | Sviberg | B60J 7/1204 |

\* cited by examiner

TOP OF A VEHICLE COMPRISING LOCKING MEANS

TECHNICAL FIELD

The invention relates to a top of a vehicle, which can be displaced between a closed position, in which it covers the vehicle interior, and a storage position, in which the vehicle interior is open toward the top, and which comprises a locking means.

BACKGROUND

A top that can be displaced between a closed position, in which it covers the vehicle interior, and a storage position, in which the vehicle interior is open toward the top, is known from practice and comprises a folding-top section, which is limited at the rear by a top cassette when the top is in the closed position and which can be folded open and moved up to a front cowl of the vehicle so as to cover the vehicle interior. A top linkage, which comprises a link arrangement on both sides with respect to a vertical longitudinal center plane and which is pivotably mounted on a main bearing, which is fixed to the vehicle, serves to displace the top cassette between a lifted operating position and a lowered storage position. For securing the top cassette in the operating position, the top has a driving wheel that has two end positions. To be able to define the two end positions of the driving wheel, a stop is formed on the main bearing, on which the driving wheel is also rotatably mounted, said stop interacting with a coupling piece in that a side surface of the coupling piece, said side surface extending approximately radially with respect to the axis of rotation of the driving wheel, collides with the stop in the first end position and a second side surface of the coupling piece, said second side surface extending approximately in the radial direction, collides with the stop in the second end position. The locking means, however, has an elaborate, cost-intensive and heavy design. Moreover, the top does not offer any way of locking the top in the storage position.

SUMMARY OF THE INVENTION

The object of the invention is to provide a top that has a locking means of a simple, cost-effective and lightweight design.

Therefore, according to the invention, a top for a vehicle is proposed that can be displaced between a closed position, in which it covers the vehicle interior, and a storage position, in which the vehicle interior is open toward the top, comprising a top linkage, which has a link arrangement on both sides with respect to a vertical longitudinal center plane of the top, each linkage arrangement being pivotably mounted on a main bearing, which is fixed to the vehicle, a top element, which can be displaced between a lifted operating position and a lowered storage position by means of the top linkage, and a locking means on both sides of the vertical longitudinal center plane of the top, each locking means being height-adjustable together with the top element and comprising a locking hook arrangement, which is displaceable between a locked position and a release position and which secures the top element, both in the operating position and in the storage position, to at least one component fixed to the vehicle body.

In the proposed top, a locking means is thus provided on both sides of the vertical longitudinal center plane of the top, each locking means comprising merely a single locking hook arrangement, which secures the top element both in the lifted operating position and in the lowered storage position. Since the locking means is height-adjustable together with the top element, a single lock or a single locking means per vehicle side is sufficient for securing. Moreover, an integrated way of locking the top in the storage position is provided in this way.

The term "component fixed to the vehicle" is to be interpreted in the broadest sense and therefore comprises elements that are arranged rigidly on the vehicle superstructure or on the vehicle body, that are mounted mobile on the vehicle body or are fixed thereto in a removable manner. The components fixed to the vehicle body, to which the locking hook arrangement secures the top element, can be pins that are formed on an inner vehicle side surface and that are part of a C- and/or D-column of the vehicle superstructure, for example.

In a special embodiment, the locking hook arrangement has at least one front locking hook and one rear locking hook, which are coupled by means of a coupling rod arrangement. The coupling rod arrangement allows synchronizing the displacement of the at least two locking hooks.

According to another aspect, the front locking hook, when in its locked position, can secure the top element to the pin fixed to the vehicle body when the top element is in its operating position. In this way, the top element is safely locked in its operating position.

According to another aspect, the rear locking hook, when in its locked position, can secure the top element to a pin fixed to the rear window when the top element is in its operating position. The pin can thus define a closed position of the rear window. When the front locking hook is secured to the pin fixed to the vehicle body and at the same time the rear locking hook is secured to the pin fixed to the rear window, the top element and the rear window are safely locked.

In a special embodiment, the rear locking hook, when in its locked position, secures the top element to a pin fixed to the vehicle body when the top element is in its storage position. In this way, the top element is safely locked in its storage position. The rear locking hook can thus be secured to the pin fixed to the rear window when the top element is in the operating position and to the pin fixed to the vehicle body when the top element is in the storage position. The rear locking hook thus fulfills a double function.

According to another aspect, the rear locking hook can be realized as a double hook and can have an inner rear locking section and an outer rear locking section. The double hook can be mirror-symmetrical in relation to a hook base. Moreover, it is contemplated for the inner rear locking section to become engaged with the pin fixed to the rear window and for the outer rear locking section to become engaged with the pin fixed to the vehicle body. A design of this kind saves space because the corresponding pins can be short.

According to another aspect, the locking hook arrangement can comprise a middle locking hook, which is coupled to the front locking hook via a front coupling rod and to the rear locking hook via a rear coupling rod and which, when in its locked position, secures the top element to a pin fixed to the vehicle body when the top element is in its operating position. In this way, the top element is secured to the vehicle body in two places on both sides of the vertical longitudinal center plane of the top when the top element is in its operating position, which reduces the introduction of torques into the top element. Moreover, a displacing movement of the locking hooks is synchronized by means of the coupling rods.

It is contemplated for the two locking hook arrangements to be displaceable between their locked position and their release position by means of a linkage main drive. The linkage main drive can drive both locking hook arrangements. Consequently, no separate drive is required in this embodiment.

Alternatively, each locking means comprises an actuator for displacing the corresponding locking hook arrangement between its locked position and its release position. In this way, the linkage main drive can be smaller, which leads to space being saved.

Furthermore, the top element can be a rear-side top cassette, at which a folding-top section of the top can be arranged.

Moreover, during displacement into the storage position, the top cassette can accommodate the folding-top section of the top that, when in the operating position, is displaceable between a closed position, in which it covers the vehicle interior, and a stowage position, in which the vehicle interior is open toward the top.

Other advantages and advantageous embodiments of the subject-matter of the invention are apparent from the description, the drawing and the claims.

DETAILED DESCRIPTION OF THE PREFERRED EMBODIMENT

FIGS. 1 to 7 of the drawings illustrate one embodiment of a vehicle superstructure 10 shown in perspective, partial and planar views as described above showing various positions of a displaceable top, which is part of a passenger vehicle realized as an all-terrain vehicle. The vehicle superstructure 10 comprises a vehicle body 12, which is provided with a roof longitudinal beam 14 on both sides with respect to a vertical longitudinal center plane of the vehicle. Between the two roof longitudinal beams 14, a roof opening 16 is formed, which can be closed by means of a top 18 in the manner illustrated in the figures.

The top 18 can be displaced between a closed position, in which it covers the vehicle interior 11 (See e.g., FIGS. 5-7), and a storage position, in which vehicle interior 11 is open toward the top, and comprises a folding-top section 20, which is stretched between the two roof longitudinal beams 14 when the top 18 is in the closed position. At the rear, the folding-top section 20 is limited by a top element realized as a top cassette 22. The top cassette 22 forms a rear-side corner portion of the top 18 and transitions into a top rear section 24, which is limited by a D-column 26 of the vehicle superstructure 10 on both sides and by a tail gate 28 at the bottom. The top rear section 24 comprises a rigid rear window 32 of the vehicle superstructure 10, the rear window 32 extending between the two D-columns 26.

The folding-top section 20 is provided with an actuating mechanism, whose drive is accommodated by the top cassette 22. As can be seen from a combined view of FIGS. 1 and 2, the folding-top section 20 is guided in the lateral roof longitudinal beams 14 while being displaced and is accommodated by the top cassette 22 when in its open position.

As the drawing further shows, the top 18 is realized as a folding top in the broadest sense, the folding-top section 20 forming the actual vehicle roof when in its closed position. The top cassette 22, which accommodates the displacement mechanism for the folding-top section 20 and which, when in the closed position, forms the rear-side corner portion of the vehicle roof, is lowered into a rear-side top storage space of the vehicle superstructure 10 together with the retracted folding-top section 20 when the top 18 is being displaced from the closed position illustrated in FIG. 1 into the storage position illustrated in FIGS. 3 and 4.

The top 18 described here is at least largely mirror-symmetrical in relation to the vertical longitudinal center plane of the vehicle. Hence, for the sake of clarity, the following description will refer only to the top portions that are located to the left with respect to the direction of forward travel of the vehicle in question. The top portions that are located to the right with respect to the direction of forward travel are realized correspondingly; hence, they are readily apparent as well.

For displacing the top cassette 22 between the lifted operating position illustrated in FIGS. 1, 2, 5, 6, 8 and 9 and the lowered storage position illustrated in FIGS. 3, 4, 7, 10 and 11, the top 18 has a linkage arrangement 34 on both sides with respect to the vertical longitudinal center plane of the top, each linkage arrangement 34 comprising a main link 36, which is pivotably mounted on a main bearing 40, which is fixed to the vehicle. Via the linkage arrangement 34, the main link 36 is connected to control links 68 and 70, whose ends facing away from the main bearing 40 are linked to a control plate 24 of the top cassette 22.

In order to adjust the top cassette 22, the rear window 32 can be pivoted into the vehicle interior; for this purpose, the rear window 32 is pivotable about a lower rear-window axis 54. Moreover, the rear window 32 is connected to rear-window links 42 and 44 of the respective linkage arrangement 34, said rear-window links 42 and 44 being drivable by means of a main drive 46, which is attached to the main bearing 40 and which also drives the main links 36 and 38. The main drive 46 can be an electric motor or a hydraulic drive.

Figure 1:
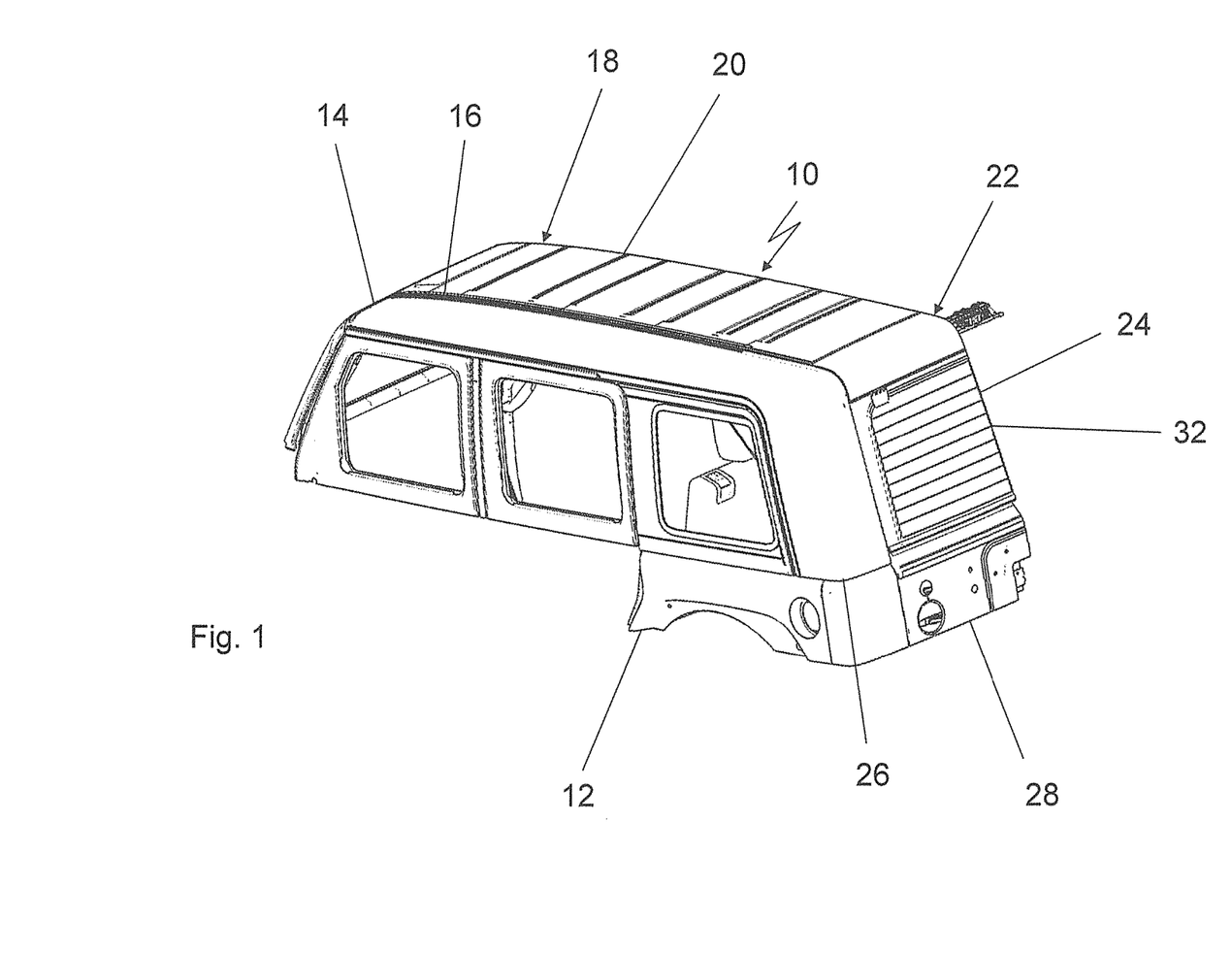
FIG. 1 shows a perspective illustration of a vehicle superstructure including a displaceable top in its closed position.
Figure 2:
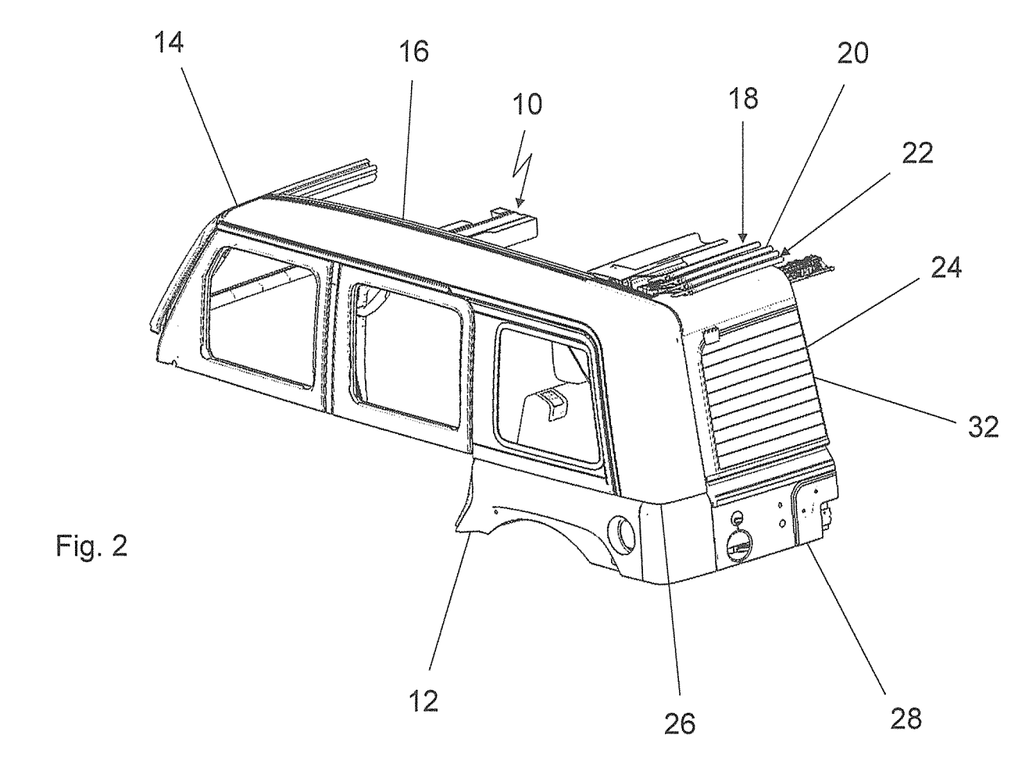
FIG. 2 shows a perspective illustration of the vehicle superstructure including a folding-top section of the top in the stowage position.
Figure 3:
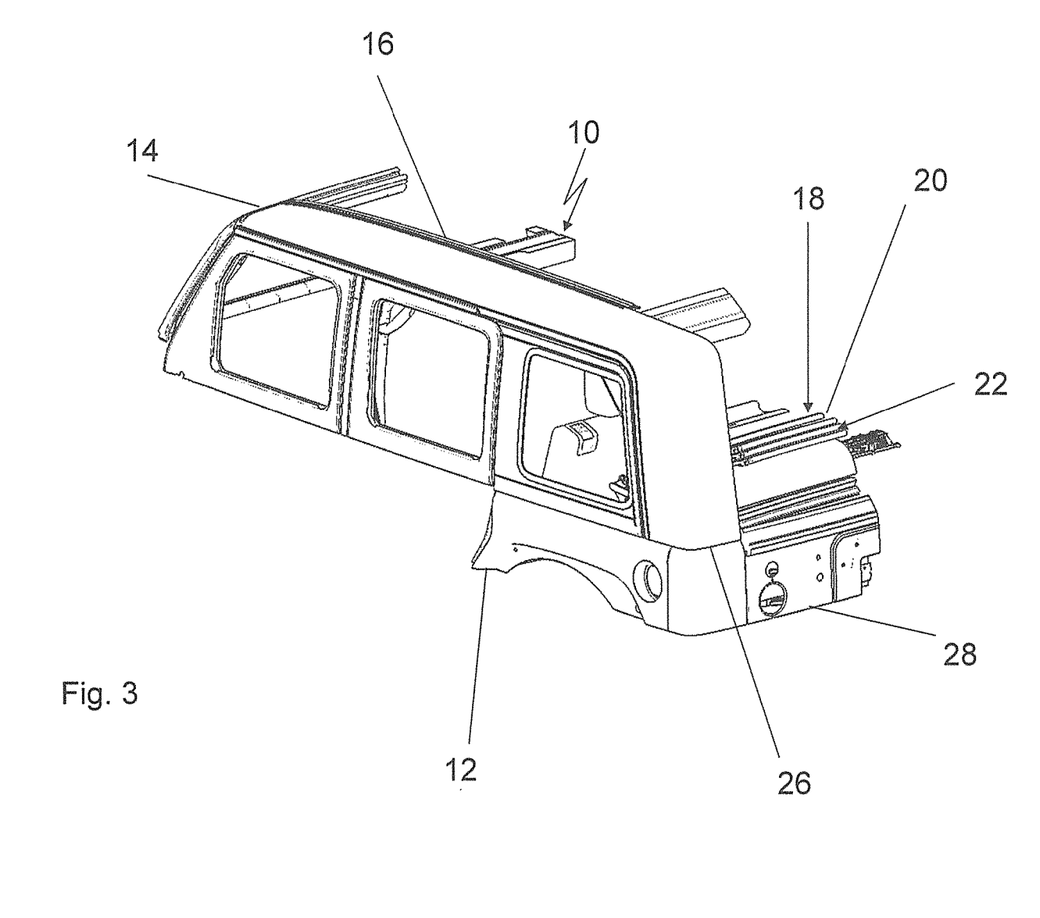
FIG. 3 shows a perspective illustration of the vehicle superstructure including the displaceable top in its storage position.
Figure 4:
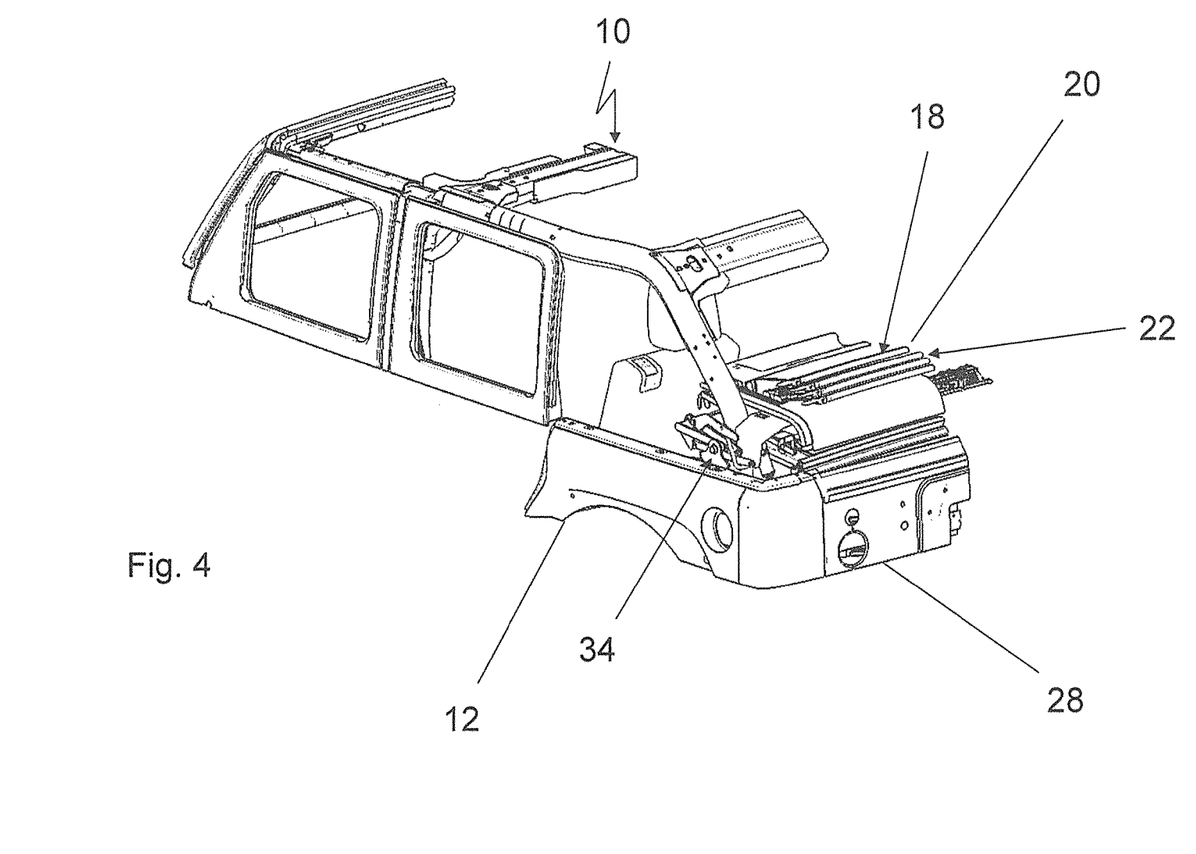
FIG. 4 shows a view corresponding to FIG. 3, but without the roof side beam and without the D-column.
Figure 5:
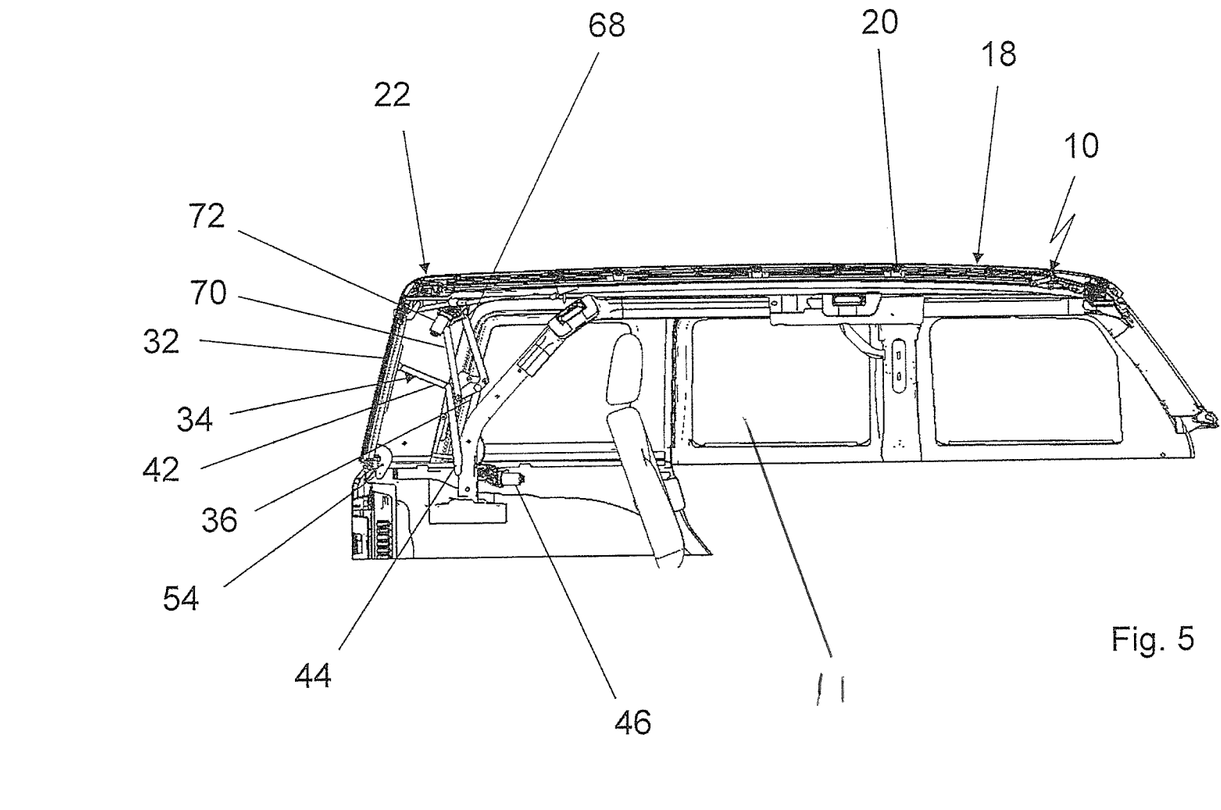
FIG. 5 shows an interior view of the vehicle superstructure according to FIG. 1.
Figure 6:
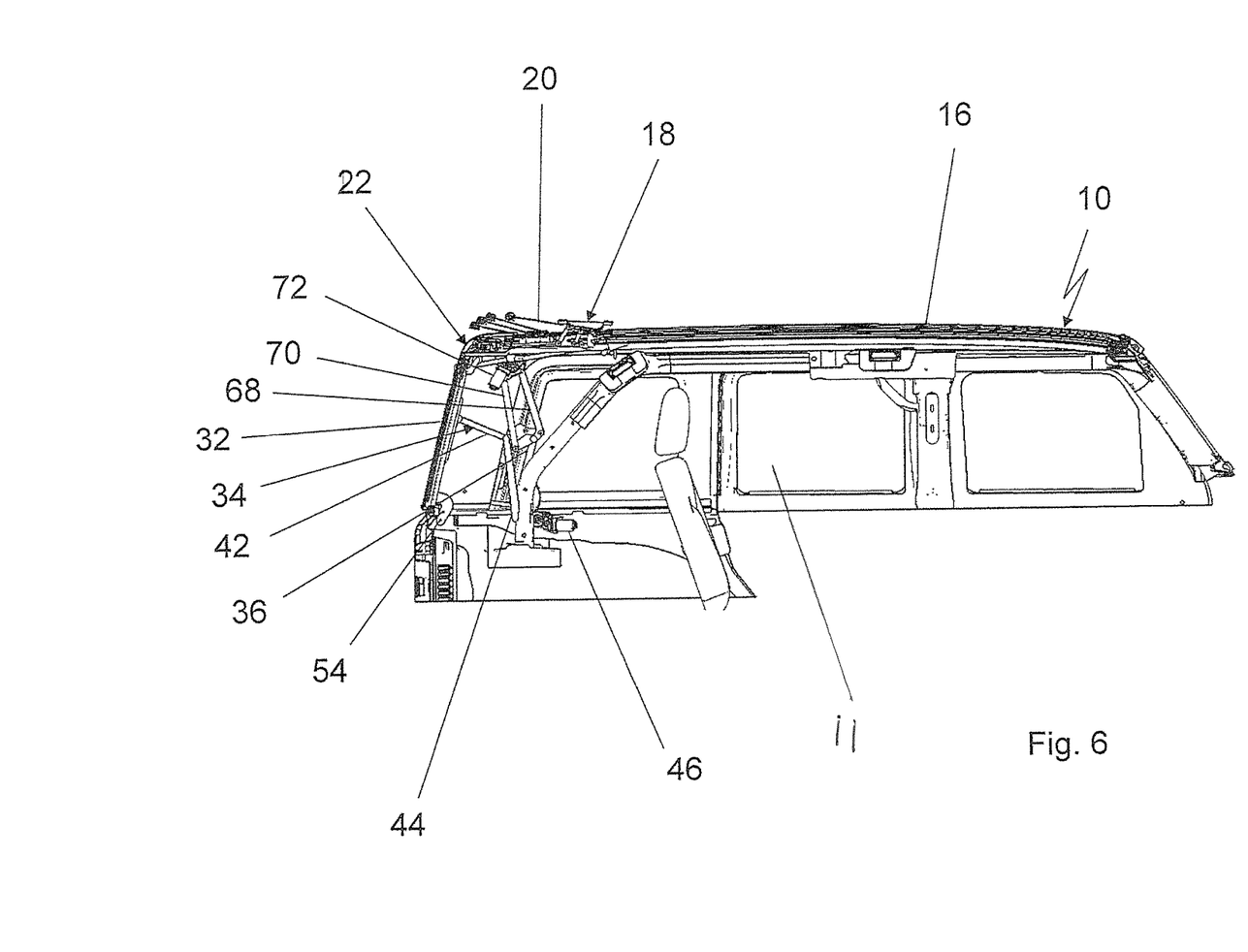
FIG. 6 shows an interior view of the vehicle superstructure according to FIG. 2.
Figure 7:
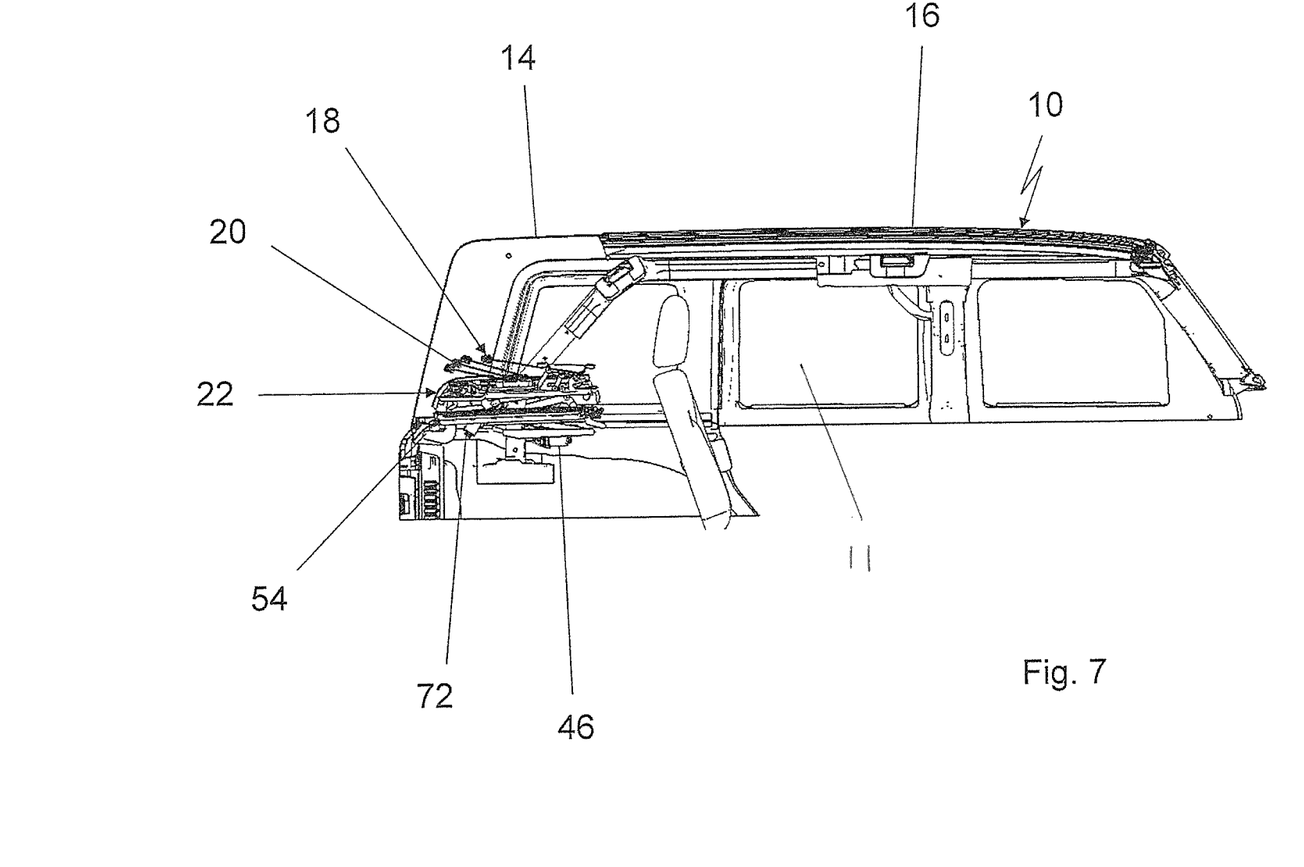
FIG. 7 shows an interior view of the vehicle superstructure according to FIG. 3.
Figure 8:
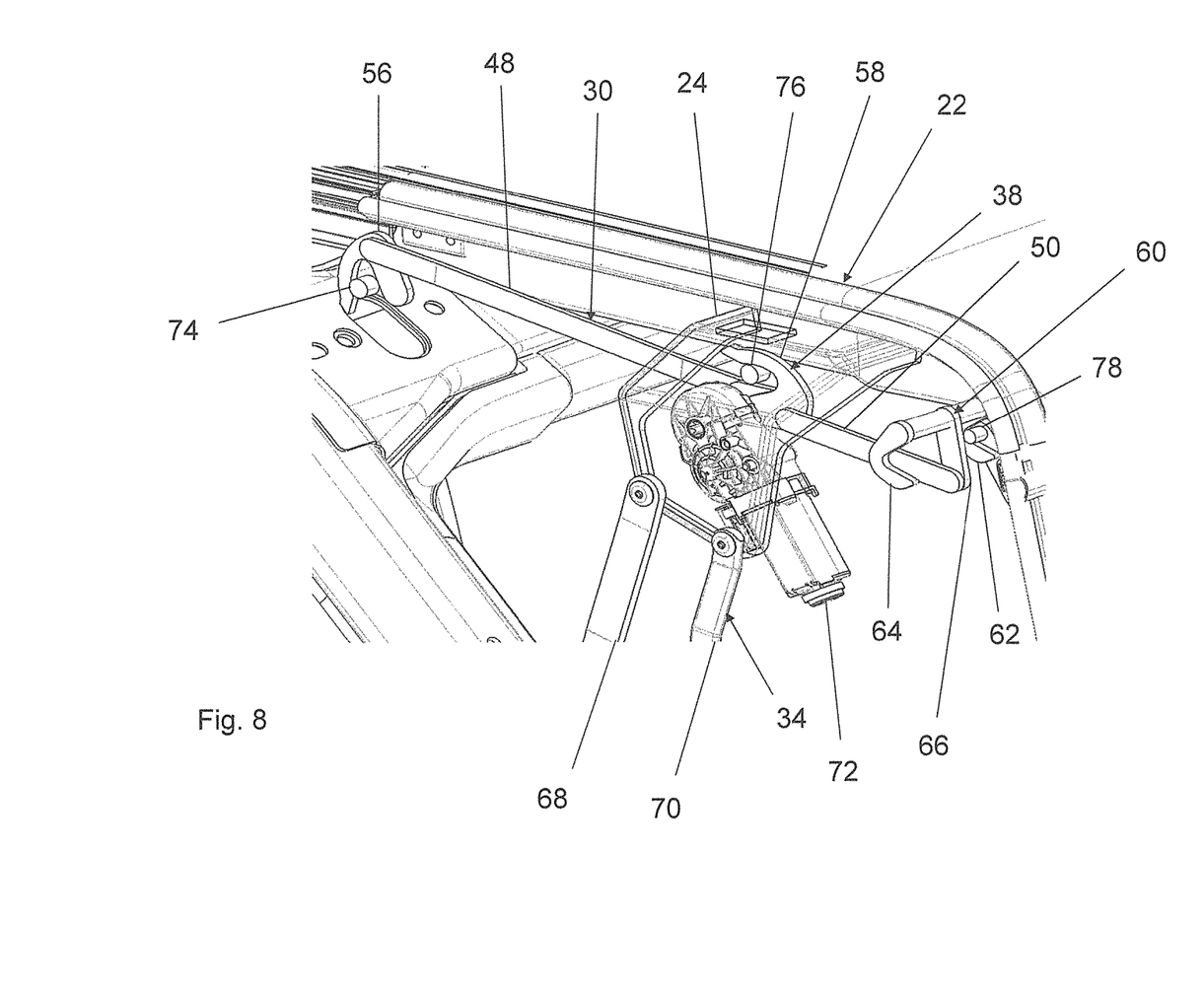
FIG. 8 shows a detailed view of the locking means in its upper locked position according to FIG. 1.
Figure 9:
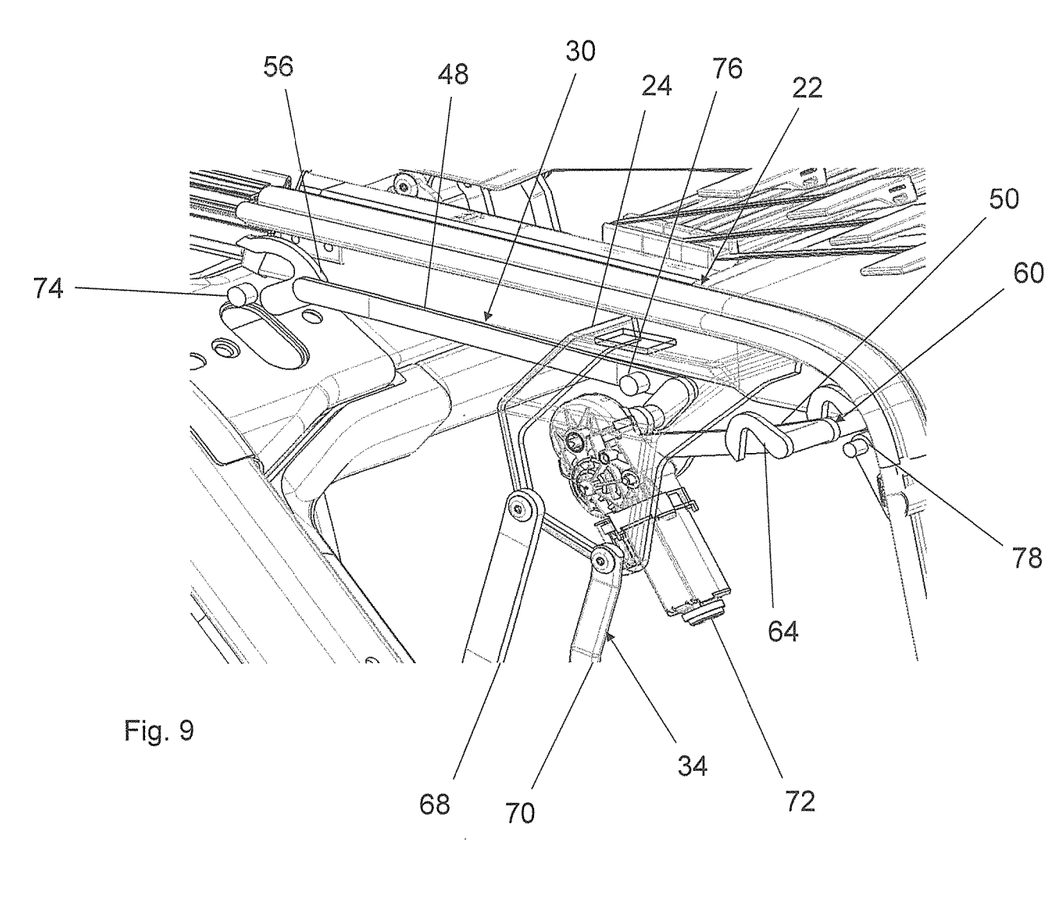
FIG. 9 shows a detailed view of the locking means in its upper locked position according to FIG. 2.
Figure 10:
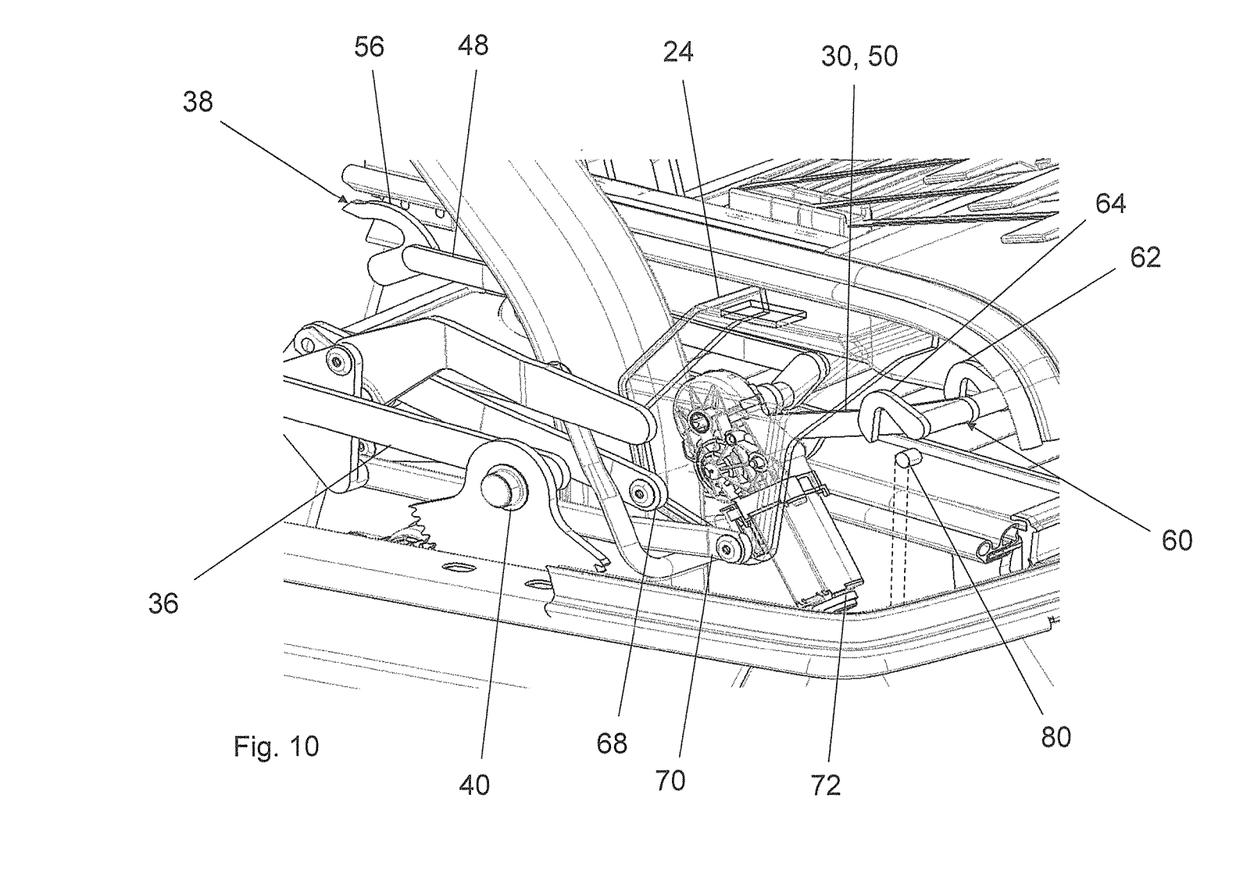
FIG. 10 shows a detailed view of the locking means in its lower release position.
Figure 11:
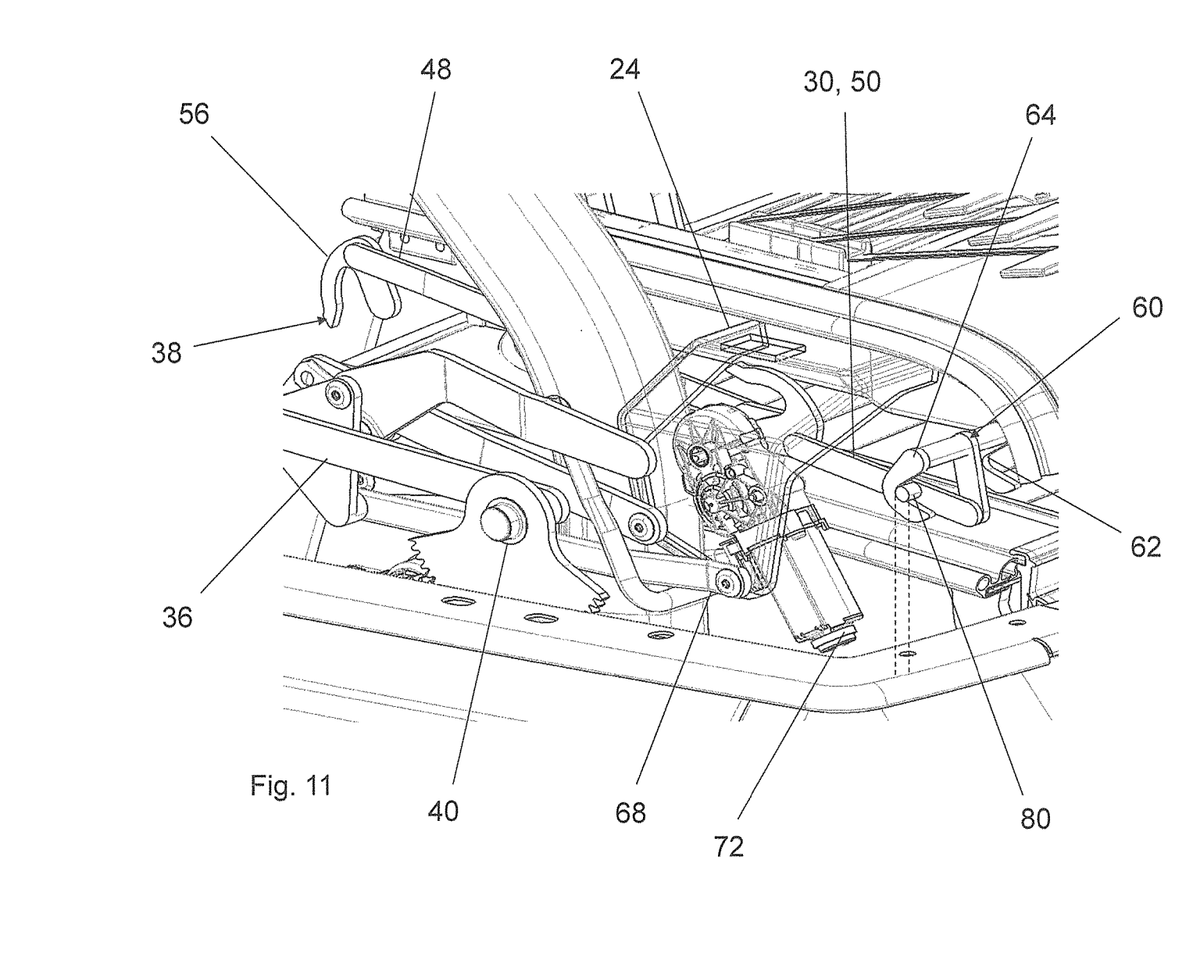
FIG. 11 shows a detailed view of the locking means in its lower release position according to FIG. 4.

Turning now to FIGS. 8-11, various positionings of locking element 30 are illustrated. As shown top 18 has a locking element 30 on both sides with respect to the vertical longitudinal center plane, each locking element 30 being height-adjustable together with the top cassette 22. Each locking element 30 can be displaced between an upper locked position, which is shown in FIG. 8, and an upper release position, which is shown in FIG. 9, and subsequently into a lower release position, which is shown in FIG. 10, and then into a lower locked position, which is shown in FIG. 11. In the upper locked position, the top cassette 22 is secured in its lifted operating position, and in the lower locked position, the top cassette 22 is secured in its lowered storage position.

The locking means 30 has a locking hook arrangement 38, which has a front locking hook 56, a middle locking hook 58 and a rear locking hook 60. The rear locking hook 60 is realized as a double hook and has an inner rear locking section 62 and an outer rear locking section 64 with respect to the vertical longitudinal center plane of the top. The rear locking hook 60 is mirror-symmetrical in relation to a hook base 66. The front locking hook 56 is coupled to the middle locking hook 58 via a front coupling rod 48. The middle locking hook 58 is coupled to the rear locking hook 60 via a rear coupling rod 50. The front coupling rod 48 and the rear coupling rod 50 form a coupling rod arrangement.

Moreover, the locking means 30 comprises an actuator 72 for displacing the locking hook arrangement 38 between its locked position and its release position. The actuator 72 is arranged on the control plate 24 and consequently lifts together with the top cassette 22 into its lifted operating position and lowers together with the top cassette 22 into its lowered storage position.

As FIG. 8 shows, the front locking hook 56 is engaged with a pin 74 fixed to the vehicle body and thus secures the top cassette 22 in its operating position. Furthermore, the middle locking hook 58 is engaged with a pin 76 fixed to the vehicle body and thus serves to secure the top cassette 22 in its operating position, as well. Moreover, the rear locking section 62 of the rear locking hook 60 is engaged with a pin 78 fixed to the rear window and thus secures the top cassette 22 in its operating position, as well.

For the top cassette to be displaced from the operating position shown in FIG. 8 into the storage position shown in FIG. 11, the actuator 72 actuates the coupling rod arrangement, causing the locking hook arrangement 38 to move into the position shown in FIG. 9. In this position, by pivoting the hooks, the front locking hook 56 is disengaged from the pin 74 fixed to the vehicle body, the middle locking hook 58 is disengaged from the pin 76 fixed to the vehicle body and the inner rear locking section 62 is disengaged from the pin 78 fixed to the rear window. The main drive 46 now pivots the rear window 32 into the vehicle via the linkage arrangement 34 and lowers the top cassette 22 with the folding-top section 20 of the top 16 accommodated therein. In this way, the position shown in FIG. 10 is reached, which corresponds to the lower release position of the locking means 30 because none of the locking hooks 56, 58 and 60 is engaged with a pin 74, 76, 78, 80.

To secure the top cassette 22 in the lowered storage position, the actuator 72 acts on the coupling rod arrangement in such a manner that the latter is displaced in reverse with respect to the direction of movement described above. In this way, the outer rear locking section 64 of the rear locking hook 60 becomes engaged with a pin 80 fixed to the vehicle body, as shown in FIG. 11. In this storage position, the front locking hook 56 and the middle locking hook 58 can be devoid of a securing function.

REFERENCE SIGNS 10 vehicle superstructure
12 vehicle body
14 roof longitudinal beam
16 roof opening
18 top
20 folding-top section
22 top cassette
24 control plate
26 D-column
28 tail gate
30 locking means
32 rear window
34 linkage arrangement
36 main link
38 locking hook arrangement
40 main bearing
42 rear-window link
44 rear-window link
46 main drive
48 front coupling rod
50 rear coupling rod
54 rear-window axis
56 front locking hook
58 middle locking hook
60 rear locking hook
62 inner rear locking section
64 outer rear locking section
66 hook base
68 control link
70 control link
72 actuator
74 pin fixed to the vehicle body
76 pin fixed to the vehicle body
78 pin fixed to the rear window
80 pin fixed to the vehicle body

The invention claimed is:

1. A top of a convertible vehicle,
which can be displaced between a closed position, in which it covers a vehicle interior, and a storage position, in which the vehicle interior is open, comprising:
a link arrangement on both sides with respect to a vertical longitudinal center plane of the top, each link arrangement being pivotably mounted on a main bearing, which is fixed to the vehicle,
the top being displaceable between a lifted operating position and a lowered storage position by the link arrangement, and
a locking means on both sides of the vertical longitudinal center plane of the top, each locking means being height-adjustable together with the top and comprising a locking hook arrangement, which is displaceable between a locked position and a release position and which secures the top, both in the operating position and in the storage position, to at least one component fixed to the vehicle body.

2. The top according to claim 1, wherein the locking hook arrangement has at least one front locking hook and one rear locking hook, which are coupled by a coupling rod arrangement.

3. The top according to claim 2, wherein, when in its locked position, the front locking hook secures the top to a pin fixed to the vehicle body when the top is in its operating position.

4. The top according to claim 2, wherein, when in its locked position, the rear locking hook secures the top to a pin fixed to the rear window when the top is in its operating position.

5. The top according to claim 2, wherein, when in its locked position, the rear locking hook secures the top to a pin fixed to the vehicle body when the top is in its storage position.

6. The top according to claim 2, wherein the rear locking hook is realized as a double hook and has an inner rear locking section and an outer rear locking section.

7. The top according to claim 2, wherein the locking hook arrangement comprises a middle locking hook, which is coupled to the front locking hook via a front coupling rod and to the rear locking hook via a rear coupling rod and which, when in its locked position, secures the top to a pin fixed to the vehicle body when the top is in its operating position.

8. The top according to claim 1, wherein the two locking hook arrangements can be displaced between their locked position and their release position by a linkage main drive.

9. The top according to claim 1, wherein each locking means comprises an actuator for displacing the corresponding locking hook arrangement between its locked position and its release position.

10. The top according to claim 1, wherein the top element is a rear-side top cassette.

11. The top according to claim 10, wherein a folding-top section of the top is arranged at the top cassette.

12. The top according to claim 11, wherein the top cassette accommodates the folding-top section of the top when being pivoted into the storage position, the folding-top section being displaceable between a closed position, in which it covers the vehicle interior, and a stowage position, in which the vehicle interior is open toward the top, when the folding top-section is in the operating position.

* * * * *